Oct. 16, 1956          J. F. RALSTON           2,766,535
                         TREE LIFTER
Filed Aug. 3, 1953                        2 Sheets-Sheet 1
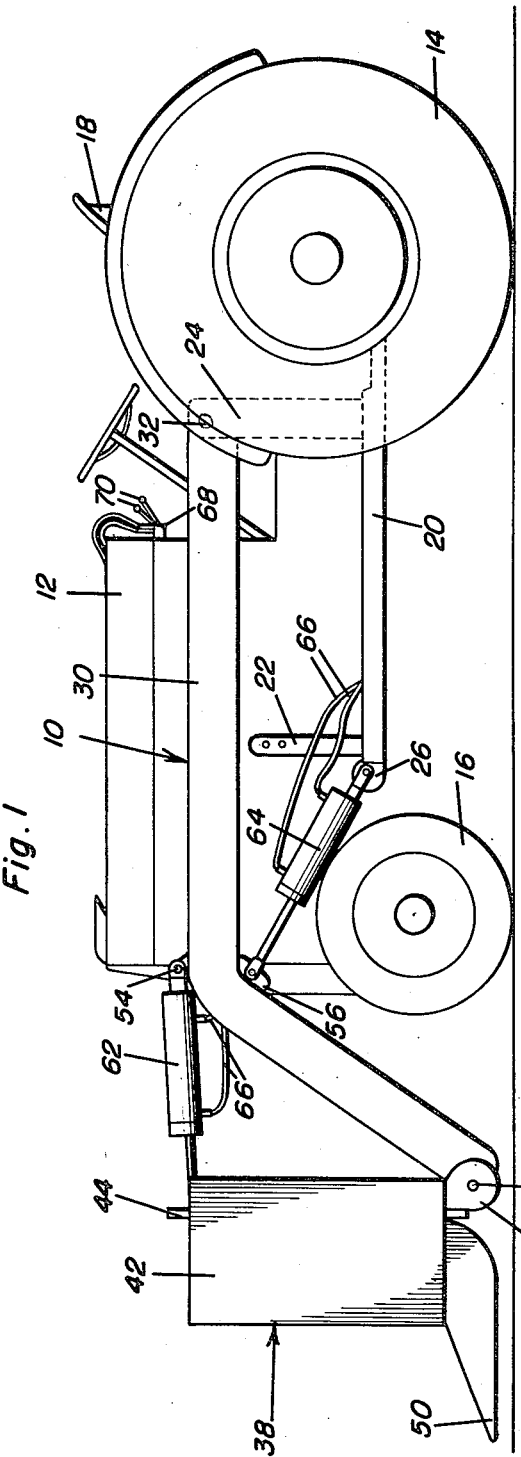
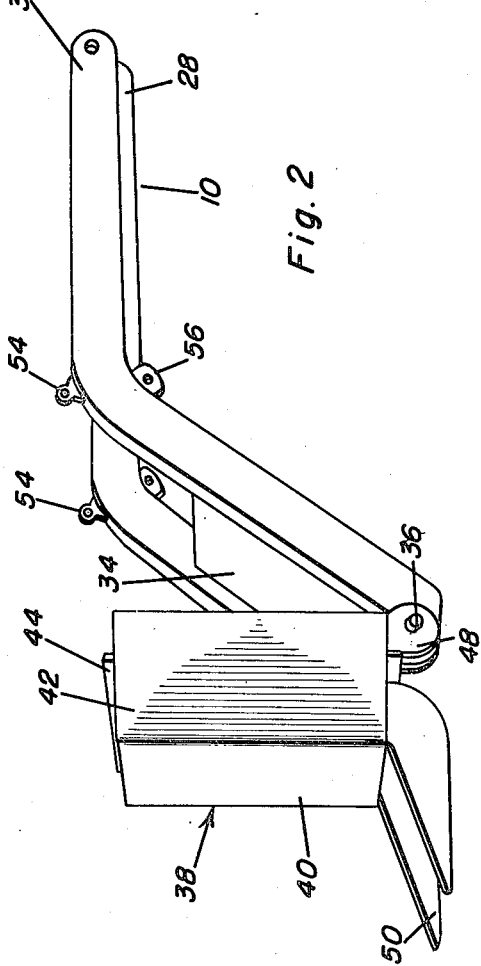
John F. Ralston
INVENTOR.

Oct. 16, 1956 J. F. RALSTON 2,766,535
TREE LIFTER
Filed Aug. 3, 1953 2 Sheets-Sheet 2
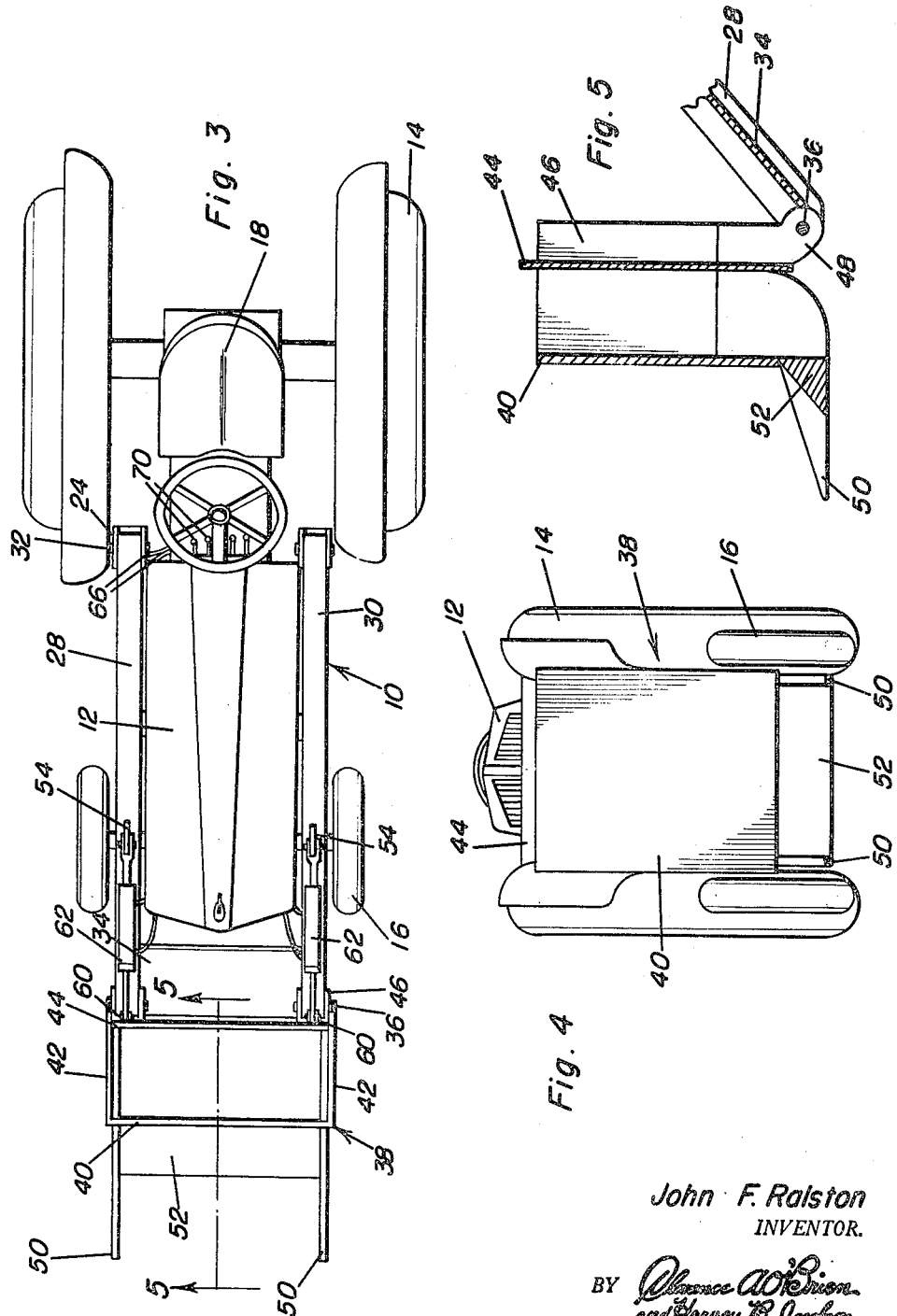
John F. Ralston
INVENTOR.

United States Patent Office 2,766,535
Patented Oct. 16, 1956

2,766,535

TREE LIFTER

John F. Ralston, Cottonwood, Ariz.

Application August 3, 1953, Serial No. 372,009

2 Claims. (Cl. 37—2)

This invention relates to a tree lifter and more specifically provides an attachment, for a tractor, having a hydraulic pump for supplying pressure for a raising and lowering mechanism which projects forwardly of a tractor.

An object of this invention is to provide a sturdy, safe, and easily constructed tree lifter attachment for a tractor.

Another object of this invention is to provide a tree lifter having spur means to engage the base of a tree and means for lifting such a tree and also pushing the tree over.

A further object of this invention is to provide a tree lifter operated from the driving seat of a tractor wherein the tree lifting mechanism extends in front of the tractor.

A still further object of this invention is to provide a tree lifter for attachment to a tractor wherein trees may be lifted whether they are in a vertical or horizontal position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of this invention showing details of the tree lifter and the relationship of the device to a tractor;

Figure 2 is a perspective view showing the tree lifter attachment with the bracket and operating means omitted;

Figure 3 is a top plan view showing the general arrangement and relationship of the tree lifter attached to the tractor;

Figure 4 is a front end view taken from the left-hand side of Figure 1 showing the relationship of the tree engaging member to the tractor, and Figure 5 is a fragmental transverse side elevational section taken substantially along section line 5—5 of Figure 3 showing details of the spur teeth and cutting edge of the tree engaging member.

Referring now more specifically to Figures 1–3 of the drawings, it will be seen that the numeral 10 generally designates a frame of the tree lifter which is attached to a tractor 12 having the usual drive wheels 14, guide wheels 16, a hydraulic pump (not shown), and an operator's seat 18.

As best seen in Figure 1 a bracket 20 is secured to the tractor 12 along the underside thereof by suitable fastening brackets 22 and upstanding from said bracket 20 on each side of the tractor is a supporting arm 24 and at the forward end of the bracket 20 is a pair of apertured ears 26 with one of such ears 26 and arms 24 being located on each side of the tractor 12. As clearly seen in Figure 2 the tree lifter frame is composed of two parallel rails 28 and 30 which are horizontally spaced and are pivotally attached to arm 24 at their rear ends by a pivot pin 32. The forward portion of rails 28 and 30 extend downwardly and forwardly and are rigidly spaced by a spacing plate 34 and the extreme end portions of the rails 30 and 28 are provided with apertures and a pivot pin 36. Pivotally secured to the rail members 28 and 30 by the pivot pin 36 is a tree lifter generally designated by the numeral 38.

The tree lifter 38 has a front plate 40, a pair of side plates 42, at right angles and extending rearwardly from the front plate 40. Rigidly secured between the side plates 40 is a rear plate 44 which with the side plates 42 and the front plate 40 forms an open-ended upstanding box-like structure. The back plate 44 is set in from the rear edges of side plates 42 and a channel member 46 is secured to the projecting edge of each of the side plates 42 and said channels 46 have apertured ear portions 48 projecting below the lower edge of side plates 42 and are pivotally attached to the frame members 28 and 30 by the use of pivot pins 36. Projecting forwardly from the front plate 40 and forming an extension of the front plate 40 is a pair of tapered spurs 50 which are formed of a generally flat plate of right angular configuration with one portion of the plate being secured to the side walls 42, in between front plate 40 and rear plate 44. Extending between the spur members 50 and spaced rearwardly of the pointed ends is a cutter bar 52 which rigidly spaces spurs 50 and also acts as a root cutter.

Now referring to Figures 1, 2, and 3, it will be seen that the rail members 28 and 30 where the front portions extend downwardly and outwardly are provided on the top of the bend with an upstanding ear 54 and on the inside of the bend with a depending ear 56 and the tree engaging member 38 is provided with a lug 60 adjacent the top and adjacent each side thereof in alignment with ears 54. An expansible and contractible piston and cylinder 62 is pivotally attached between each of the ears 54 and 60. Between the ears 56 on the frame rails 30 and 28, and the ears 26 on the bracket 20 is pivotally attached a second expansible and contractible piston and cylinder 64, and connecting the piston and cylinder arrangement 62 and 64 to the hydraulic pump of the tractor are flexible conduits 66 which are secured and communicate with a control valve 68 having control handles 70 within reach of the tractor operator seated in the tractor seat 18.

The operation of the device will be readily understood. With the bracket 20 and the frame rails 28 and 30 secured to the tractor 12 and the tree lifter 38 located on the forward portion of rails 28 and 30 and the hydraulic piston and cylinders 62 and 64 being pivotally attached to the ears 60, 54, 56, and 26 respectively, the tractor operator may engage the base of a tree with the spurs 50 by moving the tractor 12 forwardly, and by expanding piston 64 raise the tree out of the ground and by operating handle 70 on the control valve 68, the operator may expand or contract cylinder 62 for pushing a tree. Obviously the cutter bar 52 will cut any roots on the side of a tree as the spurs advance forwardly and through the combined forces of the piston and cylinder arrangement 62 and 64 as well as any forward motion of the tractor through the driving wheels 14. This attachment provides a very sturdy, easily installed, economical, and safe attachment for suitable tractors which may be used in the uprooting of trees.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tree lifter for attachment to a tractor comprising a supporting bracket adapted to be attached to a tractor, a longitudinally elongated frame having the rear end pivotally attached to the bracket and the front end terminating forwardly of the tractor, said frame including a pair of parallel rails with the front ends extending downwardly in inclined relation, means rigidly interconnecting the downwardly extending front ends of the rails, tree engaging means pivotally supported on the lower front end of the frame rails, said means including a pair of forwardly projecting pointed spurs disposed in spaced parallel relation, an upstanding plate rigidly interconnecting the spurs and disposed in substantially perpendicular relation thereby forming a tree pusher, a cutter bar extending transversely between the spurs adjacent the rear ends thereof whereby the spurs will rupture roots on the approach side of a tree and the upstanding plate will push the tree over, and means for independently swinging the frame and tree engaging means in a vertical plane.

2. The combination of claim 1 wherein said swinging means includes a fluid pressure piston and cylinder arrangement disposed between the bracket and frame in spaced relation to the pivotal connection therebetween, and a pair of fluid pressure piston and cylinder arrangements disposed between the upper end of the tree engaging means and the upper ends of the downwardly inclined portions of the frame rails.

References Cited in the file of this patent

UNITED STATES PATENTS

| | | |
|---|---|---|
| 2,302,801 | Powelson | Nov. 24, 1942 |
| 2,348,899 | Guignard et al. | May 16, 1944 |
| 2,418,251 | Drott | Apr. 1, 1947 |
| 2,437,176 | Taylor | Mar. 2, 1948 |
| 2,482,612 | Drott et al. | Sept. 20, 1949 |
| 2,506,662 | Cusenbary | May 9, 1950 |
| 2,652,639 | Kluckhohn | Sept. 22, 1953 |

FOREIGN PATENTS

| | | |
|---|---|---|
| 488,908 | Canada | Dec. 16, 1952 |